Patented Aug. 20, 1946

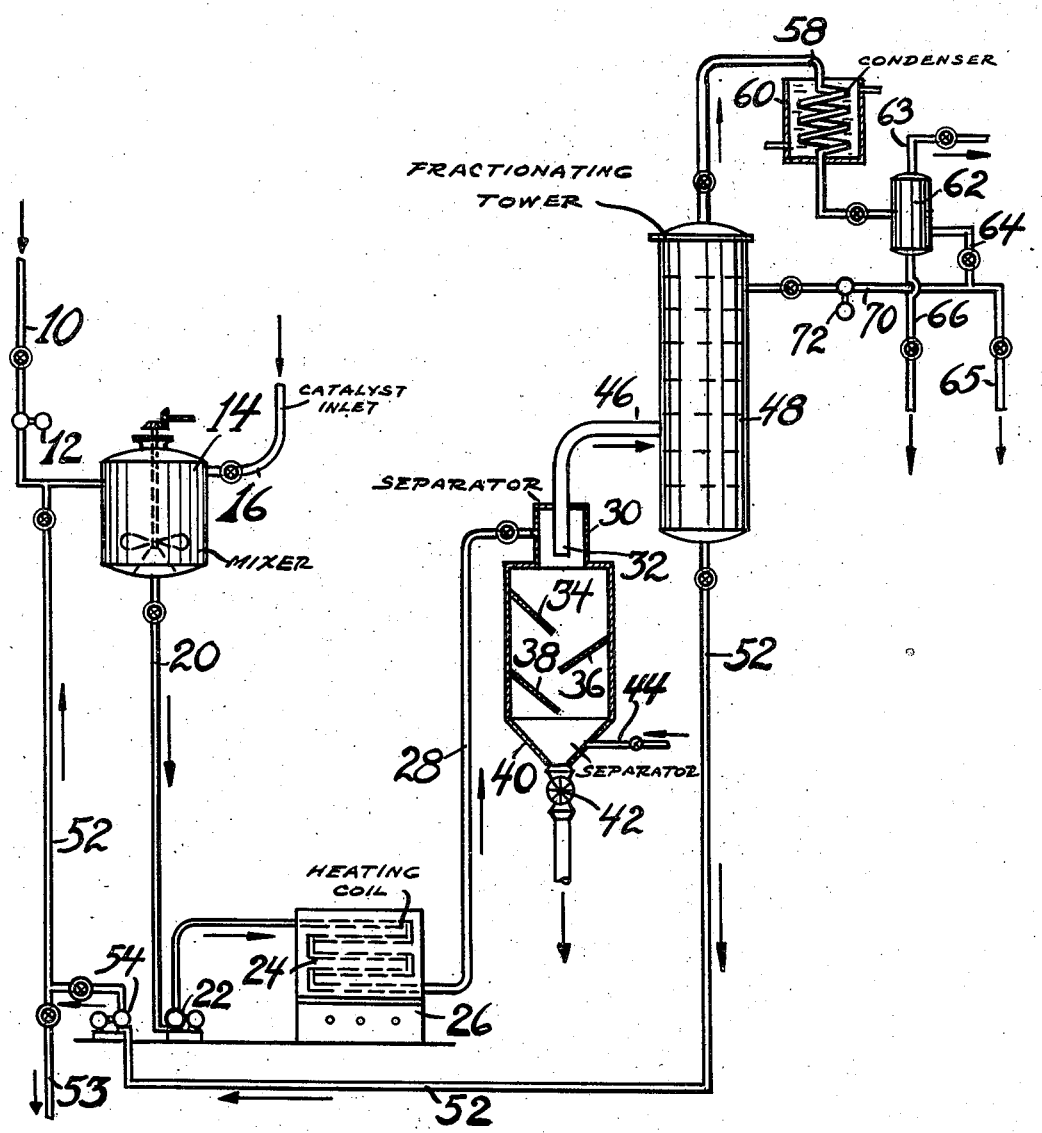

2,405,959

UNITED STATES PATENT OFFICE 2,405,959

TREATING HYDROCARBON FLUID

Paul E. Kuhl, Madison, and Robert M. Shepardson, Cranford, N. J., assignors to Standard Oil Development Company, a corporation of Delaware Application August 24, 1940, Serial No. 353,998

15 Claims. (Cl. 196—52)

This invention relates to the conversion or cracking of hydrocarbons in the presence of a catalyst and more particularly relates to the conversion of relatively heavy hydrocarbon mixtures by mixing the particles of solid catalyst with the relatively heavy hydrocarbons to form a liquid mixture or slurry and then passing the resulting slurry through a reaction zone.

It is known in the catalytic cracking of hydrocarbons to heat and vaporize the hydrocarbons and then pass the hydrocarbon vapors over stationary beds of catalyst in a catalyst tower or reaction zone. While these prior art processes may be used to produce gasoline, we have found that our invention has distinct advantages over processes using the fixed catalysts.

According to our invention, the catalyst is mixed in any suitable manner with relatively heavy hydrocarbons or other hydrocarbon mixtures, such as gas oil for example, to form a slurry. The catalyst in powdered form is mixed with the liquid hydrocarbons so as to form a liquid mixture containing the catalyst in suspension. A large quantity of catalyst per volume of hydrocarbons is used as compared to previously known methods using catalysts suspended in oil. The slurry or mixture of catalyst and liquid hydrocarbons is then passed through a reaction zone wherein the hydrocarbons are heated to reaction temperature. By using a slurry, the relatively small solid catalytic particles are substantially uniformly distributed throughout the hydrocarbon liquid and substantially all of the hydrocarbons are contacted with catalyst particles as the catalyst and hydrocarbons are passed through the conversion zone to obtain a greater yield of desired products. Another feature of our invention comprises separating the catalyst particles as a dry powder from the reaction products rather than as a slurry. In our invention, large quantities of catalyst with respect to the hydrocarbons to be cracked are used. If relatively small amounts of catalyst per oil are used, the process is not suitable for catalytic cracking of hydrocarbons because of poor yields.

In using our invention with a relatively large amount of catalyst per volume of hydrocarbon oil and passing the mixture through a conversion zone wherein it remains for a time sufficient to effect the desired extent of conversion, it has been found that improved product distribution results as compared to results obtained by using processes utilizing fixed catalysts. Also, larger yields of cycle gas oil are obtained, and the cycle gas oil is of a better quality than that obtained when using stationary or fixed catalysts. Our invention will be hereinafter described in greater detail.

In the drawing, the figure represents a diagrammatic showing of one form of apparatus adapted for carrying out our invention.

Referring now to the drawing, the reference character 10 designates a line through which the hydrocarbon oil is forced by means of pump 12 and introduced into a mixer or the like 14. The hydrocarbon oil to be converted is preferably a relatively heavy oil, such as East Texas gas oil, but other hydrocarbon oils may be used. Solid catalyst in powdered form is introduced into the mixer 14 through line 16. The catalyst may be any active cracking catalyst such as active natural or synthetic clays, Super Filtrol, synthetic gels containing silica and alumina, etc. Super Filtrol is an adsorptive material produced by the acid treatment of clay. We have given some catalysts by way of example, but our invention is not to be restricted thereto as many other cracking catalysts may be used. The mixer 14 is preferably provided with a mixing device (not shown) for mixing the hydrocarbon oil and solid catalyst particles introduced into the mixer 14 in order to maintain the catalyst particles in suspension in the oil.

Relatively large amounts of catalyst per volume of oil are used. When the catalyst is exceedingly active, such as fresh Super Filtrol, about 35–40 weight per cent on the hydrocarbon oil is preferably used. This amount may be varied, and we are not to be limited to this specific percentage range given. If the catalyst is not as active as the fresh Super Filtrol or after the Super Filtrol or other catalyst has been regenerated a number of times, larger quantities of catalyst will be required. In such cases where the catalyst is relatively inactive, about 90 to 100 weight per cent of catalyst on the oil may be used. The weight per cent of catalyst on the oil may vary from about 35% to about 100%.

The mixture or slurry of catalyst and oil are withdrawn from the bottom of mixer 14 and passed through line 20 by pump 22, and then passed through a heating coil 24 in heater 26 wherein the mixture is heated to an elevated temperature of about 800 to 950° F. and under pressure from about atmospheric to about 350 lbs. per square inch. Under these conditions, conversion of the hydrocarbon oil to lower boiling hydrocarbons is effected. The hydrocarbon oil is vaporized in the heater in the presence of the catalyst particles and substantially all of the hydrocarbon vapors are contacted by the catalyst particles, and in this way maximum conversion of the higher boiling hydrocarbons to lower boiling hydrocarbons results. The distribution of the catalyst particles in the hydrocarbon oil vapors in the reaction zone is obtained by first mixing the catalyst with the liquid hydrocarbon.

The hydrocarbon vapors and catalyst particles are maintained in the reaction zone for a relatively short period of time but sufficient to effect maximum conversion of the hydrocarbon vapors to desired product. Other types of reaction zones may be used such as reactors of a delayed settling type wherein the larger catalyst particles remain in the reaction zone for a longer period of time than the smaller catalyst particles. Also an unheated reaction vessel following the reaction zone may be employed. The products of conversion in vapor form, together with the catalyst particles, leave the reaction zone or heating coil 24 through line 28 and are introduced into the upper portion of a separator 30 which may be a cyclone separator or any other suitable apparatus for separating vapors from solid catalyst particles. In this way a dry separation of catalyst particles is obtained. The products of reaction leaving the reaction zone or coil 24 are at a relatively high temperature and they are not cooled, so that a dry separation between vapors and solids takes place in the separator 30.

During the conversion in the reaction zone or coil 24, carbonaceous material or the like settles or deposits on the catalyst particles, and it is necessary to regenerate the catalyst particles by burning off the carbonaceous deposits before re-using the catalyst. The separator 30 provides a means for separating the reaction products in vapor form from solid catalyst particles together with any carbonaceous deposit.

The separator 30 is provided in its upper portion with a downwardly extending tubular member 32, which extends below the point of introduction of the reaction products into the separator 30, so that the reaction products and solid catalyst particles are given a rotary motion and passed horizontally and downwardly before the vapors may pass upwardly through the interior of the tubular exit member 32 in the separator 30. The solid particles, together with any tar or carbonaceous material, fall downwardly in the separator 30 and strike the inclined baffle member 34 from which the catalyst and solid particles pass to the next and lower inclined baffle member 36 and then to the last inclined baffle member 38.

From the baffle member 38, the solids and catalyst particles fall into the bottom portion 40 of the separator 30 from which they are withdrawn through outlet 42 in any desired manner. The catalytic particles with their carbonaceous deposits after removal are regenerated in any suitable manner as by burning off the carbonaceous deposits with diluted air or other oxygen-containing gas, care being taken to prevent overheating of the catalyst particles. The regenerated catalyst particles are then returned to the mixing chamber 14 by means of line 16 or a separate line, if desired. While we have shown three baffle members in the separator 30, it is to be understood that these are by way of example only, and the number of baffle members may be varied as desired.

In order to assist in removing residual oil from the catalyst particles, steam, hydrogen or other heated gas is preferably introduced into the lower portion of the separator by means of valved line 44. The steam or other heated gas passes upwardly countercurrent to the down-falling catalyst particles, and in this way residual oil is vaporized and removed from the catalyst particles, and the resulting vapors are mixed with the vaporized reaction products which leave the top of the separator 30 by means of the tubular member 32 and line 46.

The hydrocarbon vapors are introduced into a fractionating tower 48 wherein the vapors are fractionated to separate a light hydrocarbon fraction containing gasoline constituents from a relatively heavy condensate oil. The condensate oil is withdrawn from the bottom of the fractionating tower 48 and passed through line 52 by pump 54. The condensate oil may be recycled to the line 10 and admixed with the feed or hydrocarbon oil being introduced into the mixer 14 or may be withdrawn at 53. In some cases, it may be desirable to withdraw the recycle stock as a side stream from tower 48 over a small quantity of bottoms so as to reduce coking in the catalytic cracking step, the bottoms being withdrawn from the system.

The vapors passing overhead from the fractionating tower 48 pass through line 58 and condenser 60 for condensing normally liquid hydrocarbons, and the cooled and condensed hydrocarbons and water are introduced into a gas separator 62 for separating gases from normally liquid hydrocarbons within the gasoline boiling range and water. The gases are removed by means of line 63, the normally liquid hydrocarbons are withdrawn from the lower portion of the separator 62 by lines 64 and 65. The water is removed from the bottom of separator 62 through line 66. Preferably, a portion of the normally liquid hydrocarbons is passed through line 70 by pump 72 and returned to the upper portion of the fractionating tower 48 as reflux for the tower.

Data are presented below showing the results obtained by mixing a gas oil with powdered Super Filtrol as catalyst to form a slurry, and this slurry is then passed through the reaction zone or coil. Data are also presented for purposes of comparison which were obtained by passing gas oil vapors over a stationary or fixed bed catalyst. The last mentioned data are correlated with the powdered moving catalyst for purposes of easier comparison. Using the catalyst-oil slurry improved product distribution over fixed catalyst operation was obtained as will be seen from an inspection of the following data.

*Powdered vs. Fixed Catalyst Operation on 33.3° A. P. I. East Texas Gas Oil*

| Operation | Powdered moving catalyst | | | Fixed catalyst correlation | |
|---|---|---|---|---|---|
| | Catalyst | | | | |
| | Powdered Super Filtrol | | | Pilled Super Filtrol | |
| Operating Conditions: | | | | | |
| Pressure, #/sq. in. gauge | Atmos. | 60 | 48 | 0 | 0 |
| Temperature, °F | 900 | 898 | 901 | 850 | 850 |
| Dry catalyst, wt. percent on oil | 58 | 38.5 | 38.5 | | |
| Steam (A), wt. percent on oil | 14.5 | 9.6 | 9.6 | 2.5 | 2.5 |
| Contact time, seconds | 15 | 43 | 36 | 9.0 | 9.0 |
| Coil velocity, ft./sec | 40 | 14 | 16.5 | | |
| Feed rate, vol. cold oil/cat. vol./hr | | | | 0.6 | 0.6 |
| Cycle length, minutes (B) | | | | 31 | 41 |
| Yields on feed: | | | | | |
| Gasoline, 10# R. V. P., percent vol | 38.4 | 38.4 | 36.2 | 38.4 | 36.2 |
| Excess butane, percent vol | .9 | 0.2 | 1.6 | 5.5 | 5.0 |
| Cycle gas oil, percent vol | 61.0 | 61.0 | 62.1 | 55.6 | 58.7 |
| Dry gas, percent wt | 2.3 | 2.6 | 2.7 | 3.8 | 3.6 |
| Coke, percent wt | 2.2 | 2.6 | 3.0 | 3.2 | 2.8 |
| Gasoline inspections, 10# R. V. P.: | | | | | |
| A. S. T. M. octane No | 79.8 | 78.1 | 77.3 | 78.9 | 78.9 |
| Percent at 212° F | 39.0 | 36.5 | 35.5 | 45.5 | 45.0 |
| Gravity cycle gas oil, °A. P. I | 33.3 | 32.9 | 33.6 | 31.6 | 31.9 |

(A) Water in undried catalyst employed.
(B) At catalyst age of 200 cycles.

In obtaining these data with the oil slurry, the catalyst was Super Filtrol and was fresh and very active. If a less active catalyst or a less active Super Filtrol is used, the quantity of catalyst per weight of oil must be increased up to about two or two-and-one-half times the amount given in the above table. After continued regenerations, the activity of the catalyst falls off and larger amounts of catalyst will be required to obtain the best results. The quantity of catalyst used will depend on the activity of the catalyst and the type of catalyst used or selected.

The cycle gas oil separated from the reaction products in the above examples was a better cracking stock than cycle gas oil obtained with stationary bed catalyst operations, and also a larger yield of gas oil was obtained with our invention.

While we have set forth examples of operating and treating oil slurries containing catalyst, it is to be understood that these examples are by way of illustration only, and modifications and changes may be made within the scope of the disclosure without departing from the spirit of the invention.

We claim:

1. A method of converting higher boiling hydrocarbons to lower boiling hydrocarbons which comprises mixing a relatively heavy hydrocarbon oil with about 38% by weight on the oil of powdered Super Filtrol in a mixing zone to form a catalyst-oil slurry, heating the slurry of oil and catalyst to an elevated temperature so that the hydrocarbon oil is substantially completely vaporized and is maintained at a conversion temperature in the presence of the Super Filtrol particles, separating vapors from catalyst particles without substantially cooling the reaction products so as to obtain a substantially dry separation, contacting the catalyst particles with a heated gas to remove residual oil from the catalyst particles, and fractionating the vapors to separate condensate oil from relatively light hydrocarbons within the gasoline boiling range.

2. A method of converting higher boiling hydrocarbons to lower boiling hydrocarbons which comprises mixing a relatively heavy hydrocarbon oil with about 38% by weight on the oil of powdered Super Filtrol in a mixing zone to form a catalyst-oil slurry, heating the slurry of oil and catalyst to an elevated temperature so that the hydrocarbon oil is substantially completely vaporized and is maintained at a conversion temperature in the presence of the Super Filtrol particles, separating vapors from catalyst particles without substantially cooling the reaction products so as to obtain a substantially dry separation and fractionating the vapors to separate condensate oil from relatively light hydrocarbons within the gasoline boiling range.

3. A method of converting higher boiling hydrocarbons to lower boiling hydrocarbons which comprises mixing a relatively heavy hydrocarbon oil with about 35 to about 100% by weight on the oil of a powdered, adsorptive, cracking catalyst in a mixing zone to form a catalyst-oil slurry, heating the slurry of oil and catalyst to an elevated temperature so that the hydrocarbon oil is substantially completely vaporized and is maintained at a conversion temperature in the presence of the particles, and separating vapors from catalyst particles without substantially cooling the reaction products so as to obtain a dry separation.

4. A method of cracking higher boiling hydrocarbons to lower boiling hydrocarbons which comprises mixing a gas oil with about 38% by weight of the oil of a solid powdered highly active clay cracking catalyst in a mixing zone to form a wet slurry, heating the slurry of oil and catalyst to a cracking temperature and passing it through a reaction zone to form lower boiling hydrocarbons as vapors and separating the vapors from relatively dry catalyst particles.

5. A method of converting higher boiling hydrocarbons to lower boiling hydrocarbons which comprises mixing a gas oil with solid, powdered, adsorptive, cracking catalyst in a mixing zone to form a wet slurry, heating said slurry of oil and catalyst to a temperature sufficient to substantially completely vaporize said gas oil, passing the mixture of vaporized gas oil and catalyst particles through a reaction zone wherein higher boiling hydrocarbons are converted to lower boiling hydrocarbons in vapor form, separating the product vapors from the catalyst particles without substantially cooling the reaction products so as to obtain a dry separation and subjecting the separated catalyst particles to contact with a heated gas to vaporize residual oil upon said catalyst particles.

6. A method of converting higher boiling hydrocarbons to lower boiling hydrocarbons which comprises mixing a gas oil with solid, powdered, adsorptive, cracking catalyst in a mixing zone to form a wet slurry, heating said slurry of oil and catalyst to a temperature sufficient to substantially completely vaporize said gas oil, passing the mixture of vaporized gas oil and catalyst particles through a reaction zone wherein higher boiling hydrocarbons are converted to lower boiling hydrocarbons in vapor form, separating the product vapors from the catalyst particles without substantially cooling the reaction products so as to obtain a dry separation, subjecting the separated catalyst particles to contact with a heated gas to vaporize residual oil upon said catalyst particles, combining the vaporized residual oil with the product vapors and fractionating the combined vapors to obtain a fraction boiling within the gasoline boiling range.

7. A method of converting higher boiling hydrocarbons to lower boiling hydrocarbons which comprises mixing a gas oil with solid, powdered, adsorptive, cracking catalyst in a mixing zone to form a wet slurry, heating said slurry of oil and catalyst to a temperature sufficient to substantially completely vaporize said gas oil, passing the mixture of vaporized gas oil and catalyst particles through a reaction zone wherein higher boiling hydrocarbons are converted to lower boiling hydrocarbons in vapor form, separating the product vapors from the catalyst particles without substantially cooling the reaction products so as to obtain a dry separation, subjecting the separated catalyst particles to contact with a heated gas to vaporize residual oil upon said catalyst particles, combining the vaporized residual oil with the product vapors and fractionating the combined vapors to separate condensate oil from the relatively light hydrocarbon fraction boiling within the gasoline boiling range and recycling the condensate oil to said mixing zone for further treatment.

8. A method of converting higher boiling hydrocarbons to lower boiling hydrocarbons which comprises mixing a gas oil with about 35 to about 100% by weight based on the oil of a solid powdered, adsorptive, cracking catalyst in a mixing zone to form a wet slurry, percentages of catalyst in the lower portion of the range being used when the catalyst is active and percentages in the upper portion of the range being used when the catalyst is less active, heating said slurry of oil and catalyst to a temperature sufficient to substantially completely vaporize said gas oil, passing the mixture of vaporized gas oil and catalyst particles through a reaction zone wherein higher boiling hydrocarbons are converted to lower boiling hydrocarbons in vapor form and separating the product vapors from the catalyst particles without substantially cooling the reaction products so as to obtain a dry separation.

9. A method of converting higher boiling hydrocarbons to lower boiling hydrocarbons which comprises mixing a gas oil with about 35 to about 100% by weight based on the oil of a solid powdered, adsorptive, cracking catalyst in a mixing zone to form a wet slurry, percentages of catalyst in the lower portion of the range being used when the catalyst is active and percentages in the upper portion of the range being used when the catalyst is less active, heating said slurry of oil and catalyst to a temperature sufficient to substantially completely vaporize said gas oil, passing the mixture of vaporized gas oil and catalyst particles through a reaction zone wherein higher boiling hydrocarbons are converted to lower boiling hydrocarbons in vapor form, separating the product vapors from the catalyst particles without substantially cooling the reaction products so as to obtain a dry separation and subjecting the separated catalyst particles to contact with a heated gas to vaporize residual oil upon said catalyst particles.

10. A method of converting higher boiling hydrocarbons to lower boiling hydrocarbons which comprises mixing a gas oil with about 35 to about 100% by weight based on the oil of a solid powdered, adsorptive, cracking catalyst in a mixing zone to form a wet slurry, percentages of catalyst in the lower portion of the range being used when the catalyst is active and percentages in the upper portion of the range being used when the catalyst is less active, heating said slurry of oil and catalyst to a temperature sufficient to substantially completely vaporize said gas oil, passing the mixture of vaporized gas oil and catalyst particles through a reaction zone wherein higher boiling hydrocarbons are converted to lower boiling hydrocarbons in vapor form, separating the product vapors from the catalyst particles without substantially cooling the reaction products so as to obtain a dry separation, subjecting the separated catalyst particles to contact with a heated gas to vaporize residual oil upon said catalyst particles, combining the vaporized residual oil with the product vapors and fractionating the combined vapors to obtain a fraction boiling within the gasoline boiling range.

11. A method of converting higher boiling hydrocarbons to lower boiling hydrocarbons which comprises mixing a gas oil with about 35 to about 100% by weight based on the oil of a solid powdered, adsorptive, cracking catalyst in a mixing zone to form a wet slurry, percentages of catalyst in the lower portion of the range being used when the catalyst is active and percentages in the upper portion of the range being used when the catalyst is less active, heating said slurry of oil and catalyst to a temperature sufficient to substantially completely vaporize said gas oil, passing the mixture of vaporized gas oil and catalyst particles through a reaction zone wherein higher boiling hydrocarbons are converted to lower boiling hydrocarbons in vapor form, separating the product vapors from the catalyst particles without substantially cooling the reaction products so as to obtain a dry separation, subjecting the separated catalyst particles to contact with a heated gas to vaporize residual oil upon said catalyst particles, combining the vaporized residual oil with the product vapors and fractionating the combined vapors to separate condensate oil from the relatively light hydrocarbon fraction boiling within the gasoline boiling range and recycling the condensate oil to said mixing zone for further treatment.

12. A method of converting higher boiling hydrocarbons to lower boiling hydrocarbons which comprises mixing a gas oil with about 35 to about 100% by weight based on the oil of an active clay cracking catalyst in a mixing zone to form a wet slurry, heating said slurry of oil and catalyst to a temperature sufficient to substantially completely vaporize said gas oil, passing the mixture of vaporized gas oil and catalyst particles through a reaction zone wherein higher boiling hydrocarbons are converted to lower boiling hydrocarbons in vapor form and separating the product vapors from the catalyst particles without substantially cooling the reaction products so as to obtain a dry separation.

13. A method of converting higher boiling hydrocarbons to lower boiling hydrocarbons which comprises mixing a gas oil with about 35 to about 100% by weight based on the oil of an active clay cracking catalyst in a mixing zone to form a wet slurry, heating said slurry of oil and catalyst to a temperature sufficient to substantially completely vaporize said gas oil, passing the mixture of vaporized gas oil and catalyst particles through a reaction zone wherein higher boiling hydrocarbons are converted to lower boiling hydrocarbons in vapor form, separating the product vapors from the catalyst particles without substantially cooling the reaction products so as to obtain a dry separation and subjecting the separated catalyst particles to contact with a heated gas to vaporize residual oil upon said catalyst particles.

14. A method of converting higher boiling hydrocarbons to lower boiling hydrocarbons which comprises mixing a gas oil with about 35 to about 100% by weight based on the oil of an active clay cracking catalyst in a mixing zone to form a wet slurry, heating said slurry of oil and catalyst to a temperature sufficient to substantially completely vaporize said gas oil, passing the mixture of vaporized gas oil and catalyst particles through a reaction zone wherein higher boiling hydrocarbons are converted to lower boiling hydrocarbons in vapor form, separating the product vapors from the catalyst particles without substantially cooling the reaction products so as to obtain a dry separation, subjecting the separated catalyst particles to contact with a heated gas to vaporize residual oil upon said catalyst particles, combining the vaporized residual oil with the product vapors and fractionating the combined vapors to obtain a fraction boiling within the gasoline boiling range.

15. A method of converting higher boiling hydrocarbons to lower boiling hydrocarbons which comprises mixing a gas oil with about 35 to about 100% by weight based on the oil of an active clay cracking catalyst in a mixing zone to form a wet slurry, heating said slurry of oil and catalyst to a temperature sufficient to substantially completely vaporize said gas oil, passing the mixture of vaporized gas oil and catalyst particles through a reaction zone wherein higher boiling hydrocarbons are converted to lower boiling hydrocarbons in vapor form, separating the product vapors from the catalyst particles without substantially cooling the reaction products so as to obtain a dry separation, subjecting the separated catalyst particles to contact with a heated gas to vaporize residual oil upon said catalyst particles, combining the vaporized residual oil with the product vapors and fractionating the combined vapors to separate condensate oil from the relatively light hydrocarbon fraction boiling within the gasoline boiling range and recycling the condensate oil to said mixing zone for further treatment.

PAUL E. KUHL.
ROBERT M. SHEPARDSON.